United States Patent
Wessels

[11] Patent Number: 6,157,881
[45] Date of Patent: Dec. 5, 2000

[54] SUPPLEMENTAL RESTRAINT REAR IMPACT DEPLOYMENT CONTROL METHOD

[75] Inventor: Gerhard F. Wessels, Haan, Germany

[73] Assignee: Delco Electronics Europe GmbH, Germany

[21] Appl. No.: 09/190,729

[22] Filed: Nov. 9, 1998

[51] Int. Cl.[7] ............... B60R 22/00; G06F 17/00; G06F 19/00; G06F 7/00
[52] U.S. Cl. ............... 701/45; 701/46; 701/47; 280/731; 280/732; 280/734; 280/735; 280/742; 280/743; 307/10.1; 340/436; 180/274; 180/282
[58] Field of Search ............ 701/45, 46, 47; 280/731, 732, 734, 735, 742, 743; 307/10.1; 340/436; 180/274, 282

[56] References Cited

U.S. PATENT DOCUMENTS

| | | | |
|---|---|---|---|
| 5,461,567 | 10/1995 | Kelly et al. | 364/424.05 |
| 5,513,109 | 4/1996 | Fujishima | 364/424.05 |
| 5,594,647 | 1/1997 | Yasuda et al. | 364/424.05 |
| 5,610,817 | 3/1997 | Mahon et al. | 364/424.056 |
| 5,702,124 | 12/1997 | Foo et al. | 280/735 |
| 5,746,444 | 5/1998 | Foo et al. | 280/735 |
| 5,758,301 | 5/1998 | Saito et al. | 701/45 |
| 5,777,225 | 7/1998 | Sada et al. | 73/488 |
| 5,787,377 | 7/1998 | Watanabe et al. | 701/45 |
| 5,801,619 | 9/1998 | Liu et al. | 340/436 |
| 5,802,480 | 9/1998 | Shiraishi | 701/45 |
| 5,899,946 | 5/1999 | Iyoda | 701/20 |
| 5,935,182 | 8/1999 | Foo et al. | 701/45 |
| 5,999,871 | 12/1999 | Liu | 701/45 |
| 6,023,664 | 2/2000 | Bennet | 702/141 |
| 6,036,225 | 3/2000 | Foo et al. | 280/735 |

*Primary Examiner*—William A. Cuchlinski, Jr.
*Assistant Examiner*—Ronnie Mancho
*Attorney, Agent, or Firm*—Jimmy L. Funke

[57] ABSTRACT

An improved deployment method for a vehicular supplemental restraint system, wherein the timing of restraint deployment in response to a detected a rear impact of sufficient severity is based on the attainment of a predefined characteristic by a signal representative of the slope of a filtered acceleration signal. As a result, the deployment of the restraints is accurately timed for any given crash event, and provides consistent performance regardless of the nature of the impact. The deployment is conditioned upon (1) detection of a predefined level of severity, and (2) a subsequent reduction in the slope of a filtered acceleration signal to a predefined level. Preferably, the predefined level of severity—i.e, the occurrence of a deployment event—is detected when (1) the filtered acceleration exceeds a predefined velocity threshold, and (2) the slope, or gradient, of the filtered acceleration exceeds a first predefined gradient threshold; and deployment is initiated when the gradient of the filtered acceleration subsequently falls to a second predefined gradient threshold. Optionally, additional severity criteria, such as the attainment of a predefined threshold by a filtered version of the filtered acceleration signal, may be used to distinguish between deployment events and non-deployment events.

12 Claims, 3 Drawing Sheets

SUPPLEMENTAL RESTRAINT REAR IMPACT DEPLOYMENT CONTROL METHOD

TECHNICAL FIELD

This invention relates to automotive supplemental restraint systems, and more particularly to a control method for deploying the restraints in response to a rear impact.

BACKGROUND OF THE INVENTION

In general, supplemental restraint systems perform a number of functions including acceleration sensing, signal processing and analysis, and deployment of one or more restraint devices such as frontal or side air bags or seat belt pretensioners in response to a sensed crash event. Typically, the acceleration signal is monitored to detect a potential crash event, and then filtered or integrated over the course of the crash event to produce a velocity change or $\Delta V$ signal. If the $\Delta V$ signal exceeds a threshold, the crash event is determined to be sufficiently severe to warrant deployment of restraints.

In general, the above considerations are utilized to gauge the severity of both front and rear impacts, the polarity of the acceleration signal being used to discriminate between the two types of impacts. However, the timing considerations differ considerably. In a frontal impact, the occupants are accelerated forward, and the usual objective is to deploy the restraints as soon as possible—that is, as soon as a crash of sufficient severity is detected. In a rear impact, on the other hand, the occupants are initially accelerated rearward against a seat back cushion, and the objective is to deploy the restraints when the rearward force on the occupants reaches a maximum.

The usual approach to deploying restraints in response to a detected rear impact is to delay deployment by a predetermined time once a rear impact of sufficient severity has been detected. In other words, the predetermined time is calibrated so that the deployment coincides as close as possible to the attainment of maximum rearward force on the occupants. However, this approach is a compromise solution, and inherently results in varying levels of performance depending on the nature of the impact. Accordingly, what is needed is a deployment control in which deployment is accurately timed for any rear impact.

SUMMARY OF THE PRESENT INVENTION

The present invention is directed to an improved deployment control method for a vehicular supplemental restraint system, wherein the timing of restraint deployment in response to a detected rear impact of sufficient severity is based on the attainment of a predefined characteristic by a signal representative of the slope of a filtered acceleration signal. As a result, the deployment of the restraints is accurately timed for any given crash event, and provides consistent performance regardless of the nature of the impact.

According to the invention, deployment is conditioned upon (1) detection of a predefined level of severity, and (2) a subsequent reduction in the slope of a filtered acceleration signal to a predefined level. In a preferred embodiment, the predefined level of severity—i.e, the occurrence of a deployment event—is detected when (1) the filtered acceleration exceeds a predefined velocity threshold, and (2) the slope, or gradient, of the filtered acceleration exceeds a first predefined gradient threshold; and deployment is initiated when the gradient of the filtered acceleration subsequently falls to a second predefined gradient threshold. Optionally, additional severity criteria, such as the attainment of a predefined threshold by a filtered version of the filtered acceleration signal, may be used to distinguish between deployment events and non-deployment events.

DETAILED DESCRIPTION OF THE DRAWINGS

Figure 1:
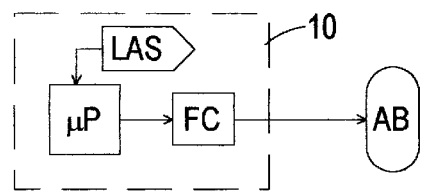
FIG. 1 is a schematic diagram of an automotive supplemental restraint system including a programmed microprocessor for carrying out the deployment method of this invention.

FIG. 1 generally depicts a vehicle supplemental restraint system in which one or more restraints, such as air bags AB, are deployed in a severe crash event to protect the vehicle occupants. The restraints may include without limitation, air bags, belt pretensioners, inflatable tubular structures, side curtains, anti-whiplash devices, etc., and it will be understood that such term AB as used herein does not refer exclusively to a particular type of restraint. A deployment control system, designated generally by the reference numeral 10, may be packaged as a single electronic module and mounted on a frame element in a central portion of the vehicle. Fundamentally, the system 10 includes a longitudinal acceleration sensor LAS (which may comprise a single sensor or a pair of sensors mounted at an offset angle) for sensing longitudinal acceleration of the vehicle, a microprocessor $\mu P$ for receiving the output signal of longitudinal acceleration sensor LAS, and a firing circuit FC which is triggered by microprocessor $\mu P$ to deploy the air bags AB in the event of a severe crash. In general, the microprocessor $\mu P$ filters the longitudinal acceleration signal over a predefined interval, or window, to form a delta velocity signal, referred to herein as $\Delta V$. In the case of a front impact, the $\Delta V$ signal is positive (by arbitrary convention), and the microprocessor $\mu P$ signals the firing circuit FC to deploy the air bags AB when the $\Delta V$ signal exceeds velocity threshold indicative of sufficient severity. In the case of a rear impact, the $\Delta V$ signal is negative (by the same convention), and the restraints AB are deployed upon (1) detection of a predefined level of severity, and (2) a subsequent reduction in the slope, or gradient, of the $\Delta V$ signal to a predefined level.

According to a preferred embodiment, the $\Delta V$ signal includes a term "B" that biases the signal toward zero; this improves the utility of the signal as a measure of severity. The zero-biased $\Delta V$ signal is referred to herein as $\Delta V_{bias}$, and may be computed by filtering the acceleration signal ACCEL, and then applying a bias "B". For example, the un-biased filtered acceleration signal $\Delta V(n)$ may be calculated according to the expression:

$$\Delta V(n) = \Delta V(n-1) + ACCEL(n) - \Delta V(n-1)/C \qquad (1)$$

where C is a constant. In turn, $\Delta V_{bias}$ is defined as:

$$\Delta V_{bias} = \Delta V - B \qquad (2)$$

where the bias B is defined as:

$$B = \begin{cases} d & \text{if } \Delta V > d, \text{ with } d \text{ being a positive integer} \\ \Delta V & \text{if } |\Delta V| \le d \\ -d & \text{if } \Delta V < -d \end{cases} \quad (3)$$

The slope, or gradient, of $\Delta V_{bias}$ is determined over a pre-defined interval or window "w", and is referred to herein as the windowed gradient $GRAD_{WIN}$. The term $GRAD_{WIN}$ can be determined with a filter corresponding to the expression:

$$GRAD_{WIN} = \Sigma[\Delta V_{bias}(i) - \Delta V_{bias}(w)], \text{ for } i=0 \text{ to } (w-1) \quad (4)$$

The true average gradient can be determined by dividing $GRAD_{WIN}$ by the window "w", but the constant "w" is preferably incorporated into the thresholds $THR_{g1}$ and $THR_{g2}$ to which $GRAD_{WIN}$ is compared.

Finally, the preferred embodiment includes consideration of a secondary measure of crash severity based on a filtered version of $\Delta V_{bias}$, such secondary measure being referred to herein as $\Delta V_{bias-f}$. The signal $\Delta V_{bias-f}$ may be computed according to the expression:

$$\Delta V_{bias-f}(n) = \Delta V_{bias-f}(n-1) + r(\Delta V_{bias}) \quad (5)$$

where $r(\Delta V_{bias})$ is defined as:

$$r(\Delta V_{bias}) = \begin{cases} +1 & \text{if } \Delta V_{bias}(n) \ge \Delta V_{bias}(n-1) \\ -1 & \text{if } \Delta V_{bias}(n) < \Delta V_{bias}(n-1) \end{cases} \quad (6)$$

Figure 2:
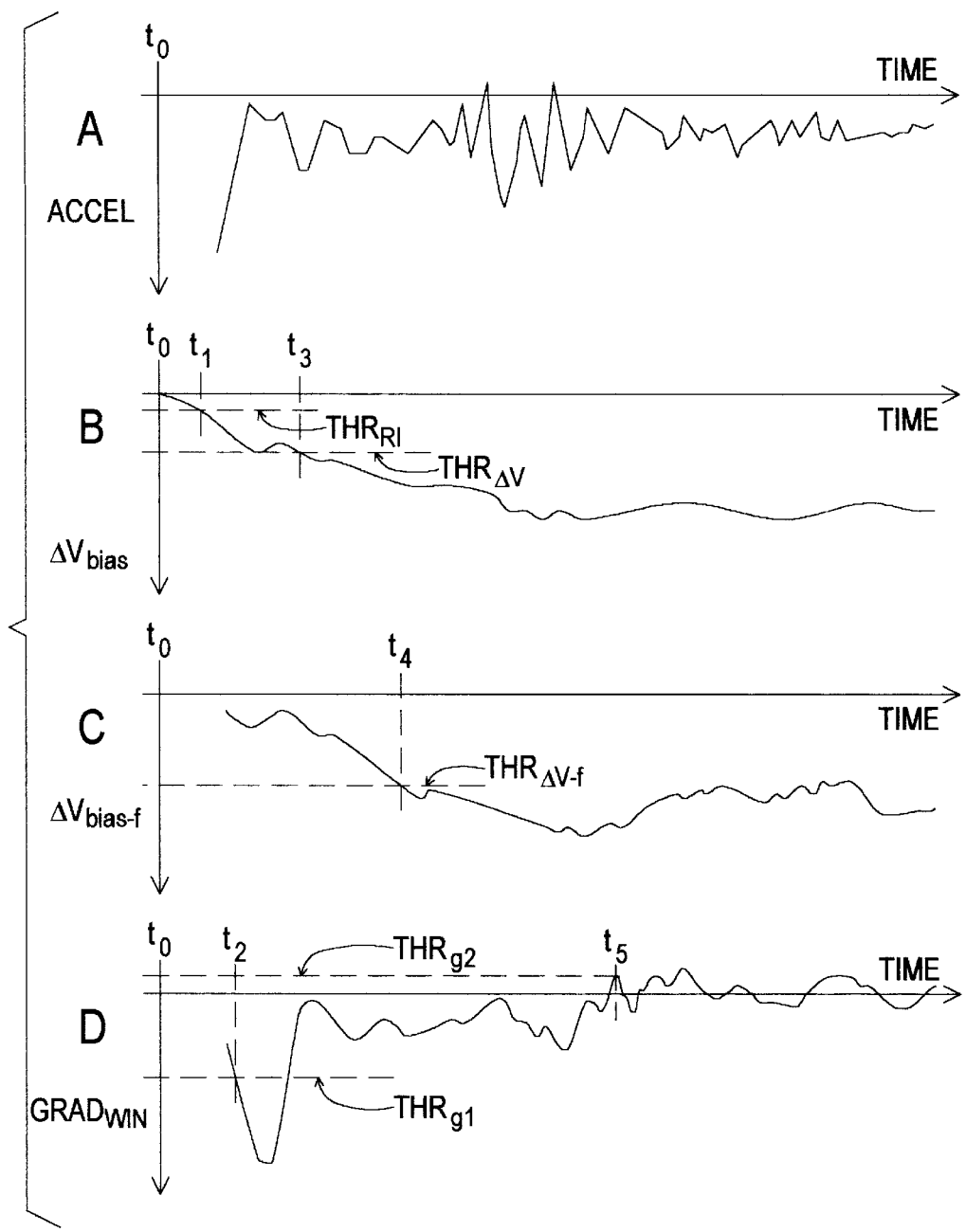
FIG. 2 is a graphical representation of various acceleration-based signals occurring in the course of a severe rear impact.

FIG. 2 depicts in Graphs A–D, respectively, the signals ACCEL, $\Delta V_{bias}$, $\Delta V_{bias-f}$ and $GRAD_{WIN}$ as a function of time for a rear impact of sufficient severity to warrant deployment of the restraints AB. The signals are depicted as having a negative polarity, but it will be understood that such convention is arbitrary. The crash begins at time $t_0$, and is detected as a potential deployment event at time $t_1$ when $\Delta V_{bias}$ crosses a rear impact threshold, designated as $THR_{R1}$. At time $t_2$, $GRAD_{WIN}$ crosses a large negative gradient threshold, designated as $THR_{g1}$; at time $t_3$, $\Delta V_{bias}$ crosses a threshold $THR_{\Delta V}$; at time $t_4$, $\Delta V_{bias-f}$ crosses a threshold $THR_{\Delta V-f}$; and at time $t_5$, $GRAD_{WIN}$ crosses a small positive gradient threshold, designated as $THR_{g2}$. The threshold crossings at times $t_2$, $t_3$ and $t_4$ are latched, signifying the occurrence of a severe rear impact, and the restraints AB are deployed at time $t_5$. In this way, the timing of the deployment coincides, as nearly as possible, with the maximum rearward force imparted to the occupants of the vehicle, thereby maximizing the safety benefit of the restraints AB.

Figure 3:
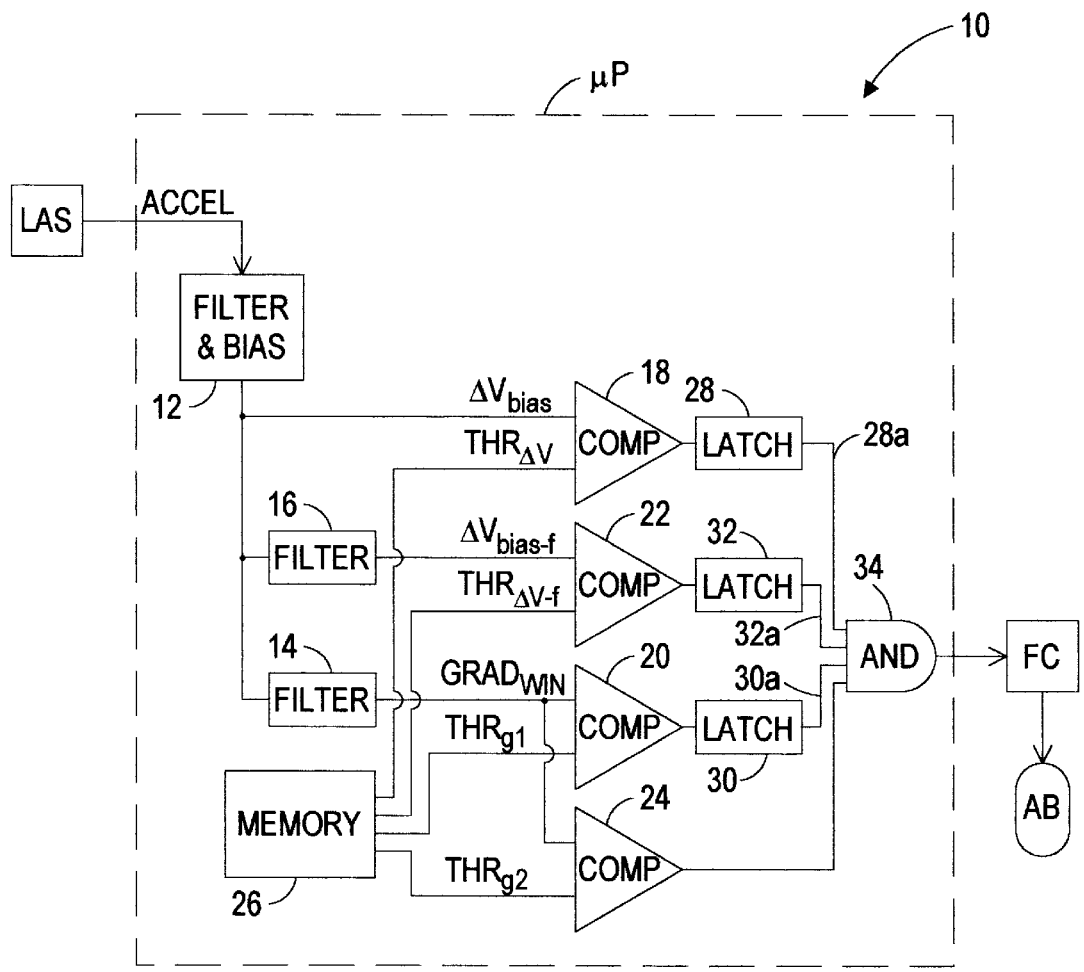
FIG. 3 is a logic diagram illustrating the operation of the deployment method of this invention.

FIG. 3 is a logic diagram of deployment control system 10, illustrating the operation of the microprocessor $\mu P$ of FIG. 1 in carrying out the control of this invention. As indicated in reference to FIG. 1, the longitudinal acceleration sensor LAS produces an acceleration signal ACCEL, and the microprocessor $\mu P$ analyzes the ACCEL signal, and commands the firing circuit FC to deploy the restraints AB if a sufficiently severe crash event is detected. The ACCEL signal is provided as an input to block 12, which develops a biased velocity signal $\Delta V_{bias}$ in accordance with equations (1)–(3). In turn the $\Delta V_{bias}$ signal is provided as an input to filter blocks 14 and 16. Block 14 develops the windowed gradient signal $GRAD_{WIN}$ in accordance with equation (4), and block 16 develops the filtered signal $\Delta V_{bias-f}$ in accordance with equations (5)–(6). The biased velocity signal $\Delta V_{bias}$ is compared to a velocity threshold $THR_{\Delta V}$ at comparator 18, the filtered $\Delta V$ signal $\Delta V_{bias-f}$ is compared to a filtered velocity threshold $THR_{\Delta V-f}$ at comparator 22, and the windowed gradient signal $GRAD_{WIN}$ is compared to first and second gradient thresholds $THR_{g1}$ and $THR_{g2}$ at comparators 20 and 24. The thresholds $THR_{\Delta V}$, $THR_{\Delta V-f}$, $THR_{g1}$ and $THR_{g2}$ are provided by the microprocessor memory 26. The outputs of comparators 18, 20 and 22 are provided to the respective latches 28, 30 and 32, which record the attainment of the condition determined by the respective comparator. Thus, latch 28 provides a logic one output on line 28a as soon as $\Delta V_{bias}$ crosses $THR_{\Delta V}$, latch 32 provides a logic one output on line 32a as soon as $\Delta V_{bias-f}$ crosses $THR_{\Delta V-f}$, and latch 30 provides a logic one output on line 30a as soon as $GRAD_{WIN}$ crosses $THR_{g1}$. The attainment of each of these conditions relates to the severity of the detected impact, and if all three conditions are met in the course of the detected event, the impact is deemed to be sufficiently severe to warrant deployment of restraints AB. Thus, the output lines 28a, 30a and 32a of all three latches 28, 30, 32 are supplied as inputs to four-input AND-gate 34. The fourth input of AND-gate 34 is coupled to the output of comparator 24, which assumes a logic one level when $GRAD_{WIN}$ crosses $THR_{g2}$. At such point, all four inputs of AND-gate 34 are satisfied, and the firing circuit FC is triggered to initiate deployment of the restraints AB. Thus, the severity of the impact is determined by the comparators 18, 20, 22 and stored in the latches 28, 30, 32, while the timing of the deployment is determined by the comparator 24.

Figure 4:
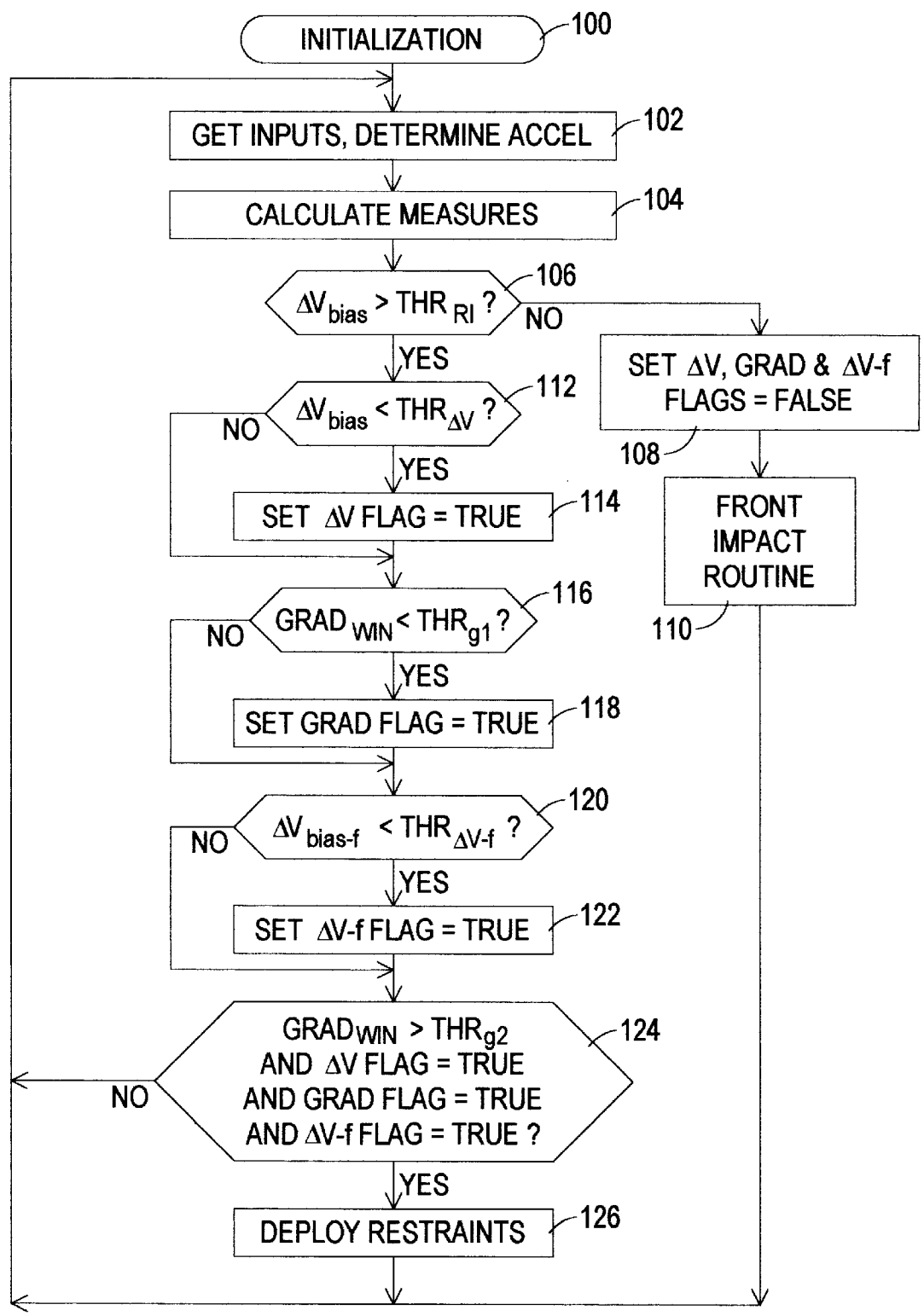
FIG. 4 is a flow diagram representative of computer program instructions executed by the microprocessor of FIG. 1 in carrying out the deployment method of this invention.

While the logic diagram of FIG. 3 is a useful aid in understanding the operation of the subject control method, it will be understood that the various blocks such as comparators 18, 20, 22, 24 are not physically present within the microprocessor $\mu P$ of FIG. 1, and that the microprocessor $\mu P$ carries out the control method by executing a computer program stored in the memory 26. FIG. 4 sets forth a flow diagram representative of pertinent portions of such a computer program. Referring to FIG. 4, the block 100 designates a series of instructions executed at the initiation of vehicle operation for initializing various registers, counters, flags and variables to pre-defined states. For example, the $\Delta V$, $\Delta V$-f and GRAD flags corresponding to the crossings of the thresholds $THR_{\Delta V}$, $THR_{\Delta V-f}$, and $THR_{g1}$ are all set to FALSE. The blocks 102 and 104 are then executed to obtain the filtered output ACCEL of the longitudinal acceleration sensor LAS, and to compute various severity measurements, including $\Delta V_{bias}$, $GRAD_{WIN}$, $\Delta V_{bias-f}$, and so on. Block 106 is then executed to determine if a rear impact is in progress by comparing $\Delta V_{bias}$ to the rear impact threshold $THR_{RI}$. If $\Delta V_{bias}$ is above $THR_{RI}$, a rear impact is not in progress, and the blocks 108–110 are executed to set the $\Delta V$, $\Delta V$-f and GRAD flags to FALSE, and to execute a routine for determining if a front impact is in progress. However, if $\Delta V_{bias}$ is below $THR_{RI}$, a rear impact is considered to be in progress, and the blocks 112, 114 and 120 are executed to compare $\Delta V_{bias}$, $GRAD_{WIN}$ and $\Delta V_{bias-f}$ to the respective thresholds $THR_{\Delta V}$, $THR_{g1}$ and $THR_{\Delta V-f}$. If $\Delta V_{bias}$ is below $THR_{\Delta V}$, the block 114 is executed to set the $\Delta V$ FLAG to TRUE. If $GRAD_{WIN}$ is below $THR_{g1}$, the block 118 is executed to set the GRAD FLAG to TRUE. If $\Delta V_{bias-f}$ is below $THR_{\Delta V-f}$, the block 122 is executed to set the $\Delta V$-f FLAG to TRUE. Block 124 then determines if all of the $\Delta V$, $\Delta V$-f and GRAD FLAGS are TRUE and $GRAD_{WIN}$ is above $THR_{g2}$; if so, block 126 is executed to deploy the restraints AB.

It will be observed that the above-described flow diagram corresponds in functionality to the logic diagram of FIG. 3.

In both instances, deployment is conditioned upon (1) detection of a predefined level of severity, and (2) a subsequent reduction in the slope of a filtered acceleration signal to a predefined level. In the illustrated embodiment, the predefined level of severity is achieved when (1) $\Delta V_{bias}$ crosses $THR_{\Delta V}$, (2) $GRAD_{WIN}$ crosses $THR_{g1}$, and (3) $\Delta V_{bias-f}$ crosses $THR_{\Delta V-f}$; and deployment is initiated when $GRAD_{WIN}$ subsequently crosses $THR_{g2}$. As indicated, the third severity condition ($\Delta V_{bias-f}$ crossing $THR_{\Delta V-f}$) is optional, and other severity conditions may be used if desired. In any event, deploying the restraints based on a specified reduction (in absolute terms) of the gradient of the filtered acceleration once the severity of the rear impact has been verified (latched) results in a deployment that is timed as close as possible to the maximum rearward force imparted to the vehicle occupants. The timing of the deployment is thus crash-dependent, and maximizes the benefit of the restraint deployment for any rear impact.

While described in reference to the illustrated embodiment, it is expected that various modifications in addition to those suggested above will occur to those skilled in the art. In this regard, it will be understood that this invention is not limited to the illustrated embodiment, and that deployment methods incorporating such modifications may fall within the scope of this invention, which is defined by the appended claims.

The embodiments of the invention in which an exclusive property or privilege is claimed are defined as follows:

1. A deployment control method for a vehicular supplemental restraint having a sensor providing a vehicle acceleration signal, and a restraint device that is deployed for vehicle occupant protection in a rear impact, the control method comprising the steps of:

filtering the acceleration signal to form a delta-velocity signal;

determining a gradient of the delta-velocity signal;

comparing the delta-velocity signal and its gradient to respective threshold values indicative of a severe rear impact;

detecting the occurrence of a severe rear impact if both the delta-velocity signal and its gradient cross the respective thresholds;

comparing the gradient of the delta-velocity signal to a secondary gradient threshold indicative of peak energy of the rear impact; and deploying the restraint device when the occurrence of a severe rear impact is detected and the gradient subsequently crosses the secondary gradient threshold.

2. The control method of claim 1, including the steps of:

determining a secondary measure of rear impact severity based on the acceleration signal;

comparing the secondary measure to a secondary threshold indicative of a severe rear impact; and detecting the occurrence of a severe rear impact if the delta-velocity signal and its gradient exceed the respective thresholds and the secondary measure crosses the secondary threshold.

3. The control method of claim 2, wherein the secondary measure of rear impact severity is determined by filtering said delta-velocity signal.

4. The control method of claim 1, wherein the gradient of the delta-velocity signal is determined by summing differences between successively formed delta-velocity signal values over a predefined interval of time.

5. The control method of claim 1, wherein the step of filtering the acceleration signal comprises the steps of:

filtering the acceleration signal; and biasing the filtered acceleration signal toward zero at a rate depending on a magnitude of the filtered acceleration signal.

6. A deployment control method for a vehicular supplemental restraint having a sensor providing a vehicle acceleration signal, and a restraint device that is deployed for vehicle occupant protection in a rear impact, the control method comprising the steps of:

filtering the acceleration signal to form a delta-velocity signal;

determining a gradient of the delta-velocity signal;

comparing the delta-velocity signal to a delta-velocity threshold indicative of a severe impact;

comparing the gradient to a first gradient threshold indicative of a severe rear impact and a second gradient threshold indicative of an attainment of maximum rearward force on the vehicle occupants due to the rear impact; and if (1) the delta-velocity signal crosses the delta-velocity threshold, and (2) the gradient crosses the first gradient threshold, then deploying the restraint device when the gradient subsequently crosses the second gradient threshold.

7. The control method of claim 6, including the steps of:

determining a secondary measure of rear impact severity based on the acceleration signal;

comparing the secondary measure to a secondary threshold indicative of a severe rear impact; and if (1) the delta-velocity signal crosses the delta-velocity threshold, and (2) the gradient crosses the first gradient threshold, and (3) the secondary measure crosses the secondary threshold, then deploying the restraint device when the gradient subsequently crosses the second gradient threshold.

8. The control method of claim 7, wherein the secondary measure of rear impact severity is determined by filtering said delta-velocity signal.

9. A deployment control method for a vehicular supplemental restraint having a sensor providing a vehicle acceleration signal, and a restraint device that is deployed for vehicle occupant protection in a rear impact, the control method comprising the steps of:

filtering the acceleration signal to form a delta-velocity signal;

comparing the delta-velocity signal to a delta-velocity threshold indicative of a severe impact, and latching the occurrence of a first severity condition if the delta velocity signal crosses the delta-velocity threshold;

determining a gradient of the delta-velocity signal;

comparing the gradient to a first gradient threshold indicative of a severe rear impact, and latching the occurrence of a second severity condition if the gradient crosses the first gradient threshold;

comparing the gradient to a second gradient threshold indicative of an attainment of maximum rearward force on the vehicle occupants due to the rear impact; and deploying the restraint device when the gradient crosses the secondary gradient threshold if the first and second severity conditions have already been latched.

10. The control method of claim 9, including the steps of:

determining a secondary measure of rear impact severity based on the acceleration signal;

comparing the secondary measure to a secondary threshold indicative of a severe rear impact, and latching the occurrence of a third severity condition if the secondary measure crosses the secondary threshold; and deploying the restraint device when the gradient crosses the secondary gradient threshold if the first, second and third severity conditions have already been latched.

11. The control method of claim 10, wherein the secondary measure of rear impact severity is determined by filtering said delta-velocity signal.

12. The control method of claim 9, including the steps of:

comparing the delta-velocity signal to a rear impact threshold indicative of a start of a potential rear impact event; and un-latching the first, second and third severity conditions if the delta-velocity signal crosses the rear impact threshold.

* * * * *